United States Patent
Yamine et al.

(10) Patent No.: US 9,456,407 B2
(45) Date of Patent: Sep. 27, 2016

(54) METHOD AND ARRANGEMENT FOR SUPPORTING CELL SELECTION

(75) Inventors: Badawi Yamine, Beirut (LB); Tomas Hedberg, Stockholm (SE); Bengt Lindoff, Bjärred (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/391,768

(22) PCT Filed: Apr. 13, 2012

(86) PCT No.: PCT/SE2012/050403
§ 371 (c)(1),
(2), (4) Date: Oct. 10, 2014

(87) PCT Pub. No.: WO2013/154479
PCT Pub. Date: Oct. 17, 2013

(65) Prior Publication Data
US 2015/0105071 A1      Apr. 16, 2015

(51) Int. Cl.
| H04W 4/00 | (2009.01) |
| H04W 48/16 | (2009.01) |
| H04W 48/04 | (2009.01) |
| H04W 64/00 | (2009.01) |
| H04W 48/18 | (2009.01) |

(52) U.S. Cl.
CPC ............ *H04W 48/16* (2013.01); *H04W 48/04* (2013.01); *H04W 48/18* (2013.01); *H04W 64/00* (2013.01)

(58) Field of Classification Search
None
See application file for complete search history.

(56) References Cited

U.S. PATENT DOCUMENTS

2009/0176507 A1\* 7/2009 Wu ................... G01S 5/04
455/456.2

FOREIGN PATENT DOCUMENTS

| JP | 2006135716 A | 5/2006 |
| WO | 9613946 A1 | 5/1996 |

(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.7.0, Mar. 2012, 1-194.

(Continued)

*Primary Examiner* — Adolf Dsouza
(74) *Attorney, Agent, or Firm* — Patents on Demand P.A.; Brian K. Buchheit; Scott M. Garrett

(57) ABSTRACT

A cell in a mobile terminal is selected from a set of serving cell candidates. A first serving cell candidate is evaluated from the set by estimating the distance from the mobile terminal to the first serving cell candidate and determining whether the estimated distance exceeds a predetermined distance, based on a criterion. In response to determining that the estimated distance exceeds the predetermined distance, no call (i.e., the executing process refrains from performing a call) on the first serving cell candidate occurs and a second serving cell candidate from the set is evaluated—even if the mobile terminal is receiving the strongest radio signals from the first serving cell candidate. In response to determining that the estimated distance exceeds the predetermined distance, identity of the first serving cell candidate is reported to an Operating Sub System (OSS).

18 Claims, 11 Drawing Sheets

(56) References Cited

FOREIGN PATENT DOCUMENTS

| WO | 2008075078 A1 | 6/2008 |
|---|---|---|
| WO | 2009131507 A1 | 10/2009 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 2012, 1-302.

3GPP, "3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.5.0, Mar. 2012, 1-33.

3GPP, "3rd Generation Partnership Project; Technical Specification Group Radio Access Network; Physical channels and mapping of transport channels onto physical channels (FDD) (Release 10)", 3GPP TS 25.211 V10.0.0, Sep. 2010, 1-58.

3GPP, "3rd Generation Partnership Project; Technical Specification Group Radio Access Network; Radio Resource Control (RRC); Protocol specification (Release 10)", 3GPP TS 25.331 V10.7.0, Mar. 2012, 1-1885.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.0.0, Dec. 2011, 1-194.

3GPP, "3rd Generation Partnership Project; Technical Specification Group Radio Access Network; Physical channels and mapping of transport channels onto physical channels (FDD) (Release 11)", 3GPP TS 25.211 V11.0.0, Dec. 2011, 1-60.

Unknown, Author, "Range expansion for efficient support of heterogeneous networks", 3GPP TSG-RAN WG1 #54bis, R1-083813, Qualcomm Europe, Prague, Czech Republic, Sep. 29-Oct. 3, 2008, 1-3.

* cited by examiner

METHOD AND ARRANGEMENT FOR SUPPORTING CELL SELECTION

TECHNICAL FIELD

The invention relates generally to cell selection, and particularly to preventing selection of certain types of cells as serving cell.

BACKGROUND

In most cellular communication networks there are cells, which broadcast signals, which reaches far beyond the desired planned cell border. This may be due to a number of different reasons, e.g. that the Radio Base Station (RBS) associated with the cell is located on a hill or on a high building. It could also be due to insufficient optimization, e.g. of the transmit power used for transmission of signals from the RBS. Further, it could be due to newly integrated sites (RBSs/cells), which are not yet totally optimized.

Since the signals of such cells reach beyond the cell border, mobile terminals located at a substantial distance, i.e. far from the cell may receive a strong signal from such a cell at certain locations. This may lead to that the mobile terminal performs a call on such a distant cell, rather than on a cell that is located geographically closer to the mobile terminal, which is undesired. Such cells, which are located further away from a mobile terminal than a predefined threshold, on which cells it is undesired that a mobile terminal performs a call, will henceforth be denoted 'distant cells'. Even though connection to a distant cell is possible, such a connection entails a high risk for so-called drop calls, and is therefore undesired. A drop call is, as the name indicates, a call, which is dropped or lost in an unintentional way.

Calls that are performed on distant cells may be detected by optimization engineers by checking some performance counters on the OSS (Operating Sub System) or via signaling message analysis after an increase in the number of drop calls. In order to solve the problem of calls performed on distant cells, the optimization engineers would probably adjust the antenna tilt of the antennas associated with the undesired cell or they might reduce the strength of the cell radio signal power. However, this type of solutions are slow and inefficient.

SUMMARY

It would be desirable to have a more efficient solution to the problem of mobile terminals performing calls on distant cells. As an alternative to the solutions described above, this disclosure covers the introduction of a mobile centric solution, where the distance between the mobile terminal and the RBS associated with a serving cell candidate is determined, on the mobile side, e.g. during or prior to a call setup. If the distance to the RBS is higher than a certain threshold, action should be taken in order to try to find a more suitable serving cell candidate, which is located closer to the mobile terminal.

By using the herein suggested solution the following advantages, as compared to the prior art, may be achieved: Call dropping due to hand over of a UE from a distant cell to a neighbor of the distant cell may be avoided; Uplink interference may be reduced due to that communication with a distant cell is avoided; Power consumption associated with communication over a considerable distance may be reduced; RBS power that would have been required for communication with a distant UE (usually with bad radio link quality), may instead be used for mobile terminals close to the RBS.

Further, the time it takes to detect and identify cells or areas having 'distant cell' problems can be made much shorter than in the case of prior art. For example, all detected 'distant cells' could be reported to the operator via the OSS, and thus enable optimization engineers to quickly identify and attend to the distant cell problems in the network. Further, until the distant cell problem is solved, e.g. by optimization engineers tilting antennas or adjusting transmit power, the herein suggested solution may be used for avoiding that mobile terminals camp on or make calls on distant cells. This is a huge benefit in comparison with the prior art.

According to a first aspect, a method in a mobile terminal associated with a set of serving cell candidates is provided. The method comprises evaluating a first serving cell candidate from the set by estimating the distance from the mobile terminal to the first serving cell candidate. The method further comprises determining whether the estimated distance exceeds a predetermined distance, based on a criterion. The method further comprises refraining from performing a call on the first serving cell candidate if the estimated distance exceeds the predetermined distance (even if this is the strongest candidate) and instead evaluate a second serving cell candidate from the set.

According to a second aspect, an arrangement in a mobile terminal associated with a set of serving cell candidates is provided. The arrangement comprises an estimation unit, adapted to estimate the distance from the mobile terminal to a serving cell candidate. The arrangement further comprises a determining unit adapted to determine whether the estimated distance exceeds a predetermined distance, based on a criterion. Further, the arrangement comprises a cell selection control unit, adapted to, if the estimated distance exceeds the predetermined distance, initiate a cell reselection, excluding the evaluated serving cell candidate from selection, to find another serving cell candidate for evaluation.

According to a third aspect, a method in a network node is provided for supporting cell selection in a communication system. The communication system comprising a mobile terminal associated with a set of serving cell candidates. The method comprises signaling information to the mobile terminal, where the information comprises an indication of whether cell synchronization is applied; an indication of a predetermined distance, representing an upper limit for a distance to a serving cell; and/or information related to the geographical location of a number of the candidate serving cells.

According to a fourth aspect, a network node is provided for supporting cell selection in a communication system communication system comprising a mobile terminal associated with a set of serving cell candidates. The network node comprises a signaling unit, adapted to signal information to the mobile terminal, where the information comprises an indication of whether cell synchronization is applied; an indication of a predetermined distance, representing an upper limit for a distance to a serving cell; and/or information related to the geographical location of a number of the candidate serving cells.

The methods arrangement and network node described above may be implemented in different embodiments, which will be exemplified in this description.

BRIEF DESCRIPTION OF THE DRAWINGS

The herein suggested technology will now be described in more detail by means of exemplifying embodiments and with reference to the accompanying drawings, in which.

DETAILED DESCRIPTION

Three different variants of the herein suggested solution will be described below, namely that a distant cell is detected based on one of the following: 1) Based on time elapsed in the RA procedure that is triggered during a call setup, 2) based on detection of cell timing, when cells are synchronized, and 3) based on terminal positioning and a database of cell identities and the respective coverage area of the cells.

Within this description, the terms "mobile terminal" and "UE" (User Equipment) will be used interchangeably for describing a device capable of wireless communication, preferably a phone, such as a smartphone, operable in a cellular communication system. However, the device could alternatively be a tablet, a computer, or other communication gadget. Further, throughout the description cells are described as taking different actions, such as e.g. that "a cell broadcasts information". In such cases, it is to be understood that it in fact is the RBS associated with the cell, which is referred to, and which performs the different actions. This is also true for cases where e.g. the distance to "a cell" is measured, i.e. it is the distance to the RBS associated with the cell (or the antennas of the RBS) that is measured.

Figure 1:
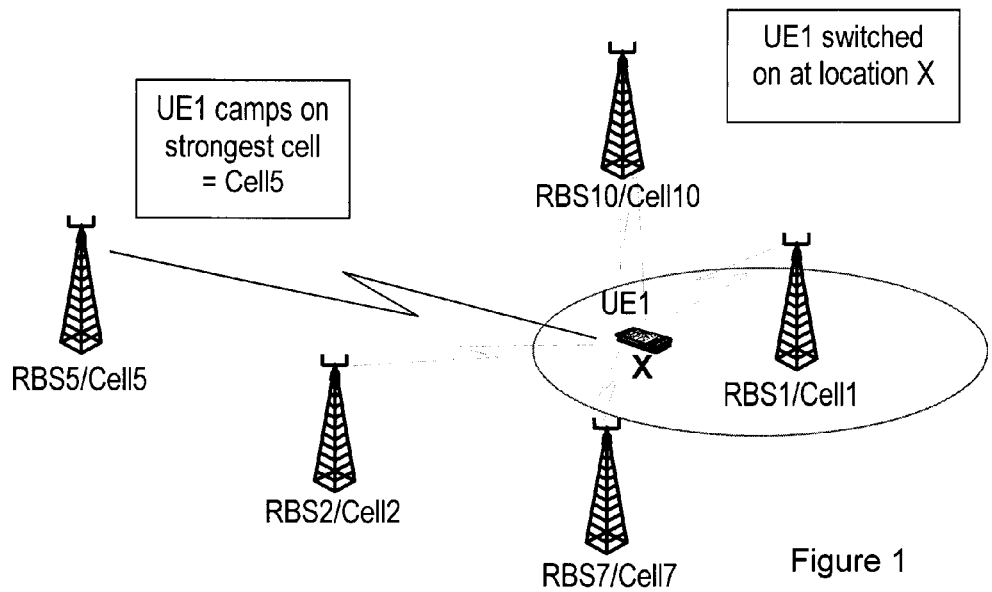
FIG. 1 shows an example where a mobile terminal is camped on the strongest cell, which is located far away from the mobile terminal.
Figure 2:
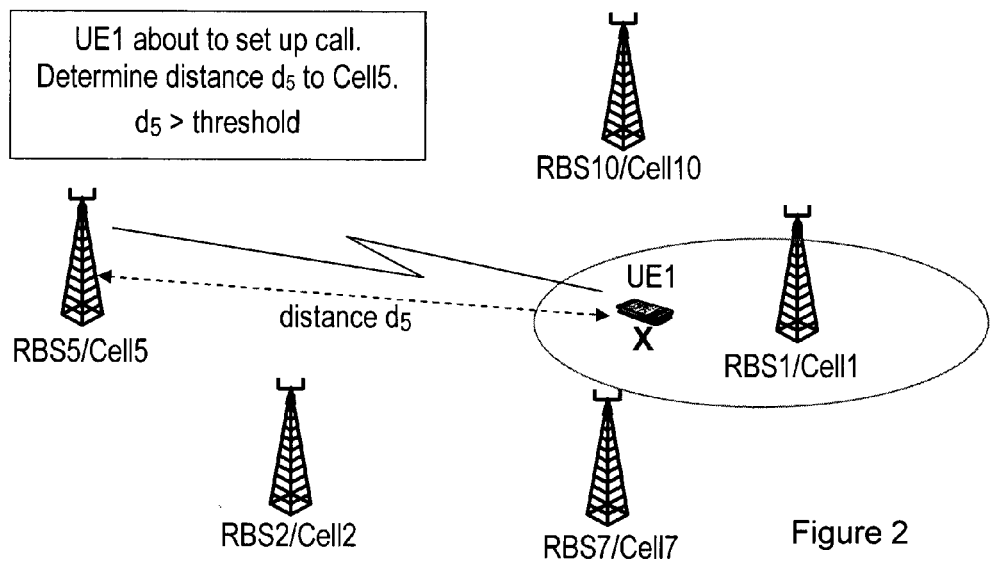
FIG. 2 illustrates a mobile terminal initiating a call setup on a distant cell.

FIG. 1 shows an example situation, where a mobile terminal is switched on at location X close to a cell, Cell1. However, due to insufficient, or bad, optimization of the neighboring cells (e.g. bad antennas locations, too high power transmission etc.), the strongest radio signals received by the mobile terminal are transmitted from a distant cell, Cell5. Thus, when the mobile terminal detects a strong (the strongest) received radio signal from Cell5, it camps on it. In systems according to the prior art, the mobile terminal would, in event of a call, have performed the call on Cell5, as shown in FIG. 2. However, according to the solution described herein, the mobile terminal avoids performing the call on the distant cell, Cell5, and selects a closer cell to perform its call.

How to Detect if a Cell is Distant:

A mobile terminal could determine the distance to a cell in a number of different ways. Below, three different methods will be described:

Method 1:

The first method is based on the Random Access (RA) procedure that is triggered during a call setup. The distance to the cell in question is calculated via a general formula 'd=v*t', i.e. 'distance=(velocity of signal)*(time)'. As the velocity of the signal is known (=the speed of light, i.e. 299,792,458 meters per second), the distance may be calculated by determining the time it takes for a signal to propagate from the RBS of the cell to the mobile terminal.

Figure 3:
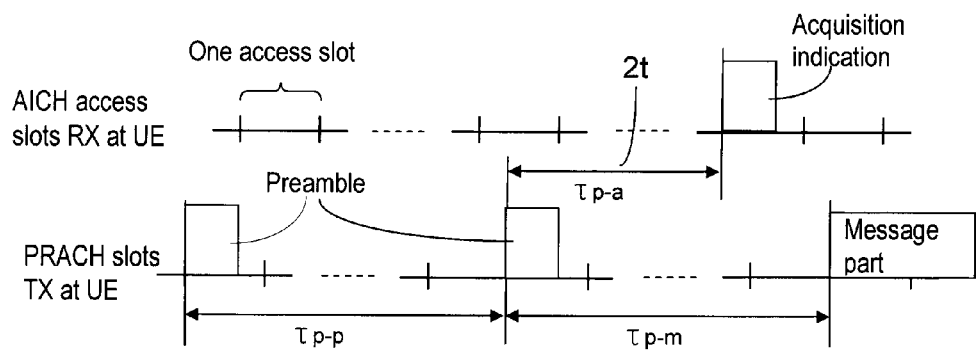
FIG. 3 is extracted from 3GPP 25.211 and illustrates the UMTS PRACH procedure.

For the purpose of determining the time, the relation in time between different transmissions may be utilized. FIG. 3 illustrates such a relation in time between transmissions related to RA in an UMTS system (Universal Mobile Telecommunications System). The time 't' may be estimated as corresponding to half the time difference illustrated in FIG. 3 as $T_{p-a}$ (tau), from the moment the PRACH (Physical Random Access Channel) preamble is sent to the RBS until the time when the mobile terminal receives the AICH (Acquisition Indication Channel) message.

Figure 4:
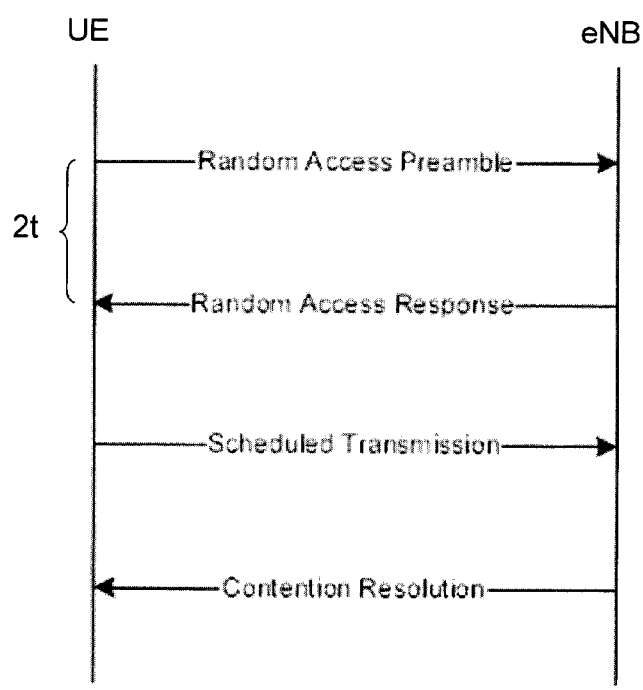
FIG. 4 is extracted from 3GPP 36.300 and illustrates EUTRAN Contention based Random Access procedure.

Analogously, in EUTRAN (Evolved UMTS (Universal Mobile Telecommunications System) Terrestrial Radio Access Network), which is illustrated in FIG. 4, the time 't' may be estimated as corresponding to half the time difference from the moment the mobile terminal sends the 'Random Access Preamble' until the time when the mobile terminal receives a 'Random Access Response'. If the calculated distance exceeds a certain threshold, the mobile terminal may conclude that the cell, on which it is about to perform the call, is a 'distant cell', and thus is undesired as a serving cell. According to the solution described herein, as a consequence, the call setup is immediately terminated and the mobile terminal starts the process of finding a more suitable serving cell located at a distance which does not exceed the threshold.

Note that the estimated time 't' above also comprises a certain amount of processing time in the RBS. That is, when the mobile terminal sends a message to the RBS, it does not instantly receive a response from the RBS, since some time is spent e.g. on processing the received message in the RBS. Hence, if a more accurate estimate of the distance is needed, the duration of the processing time at the RBS should be taken into account.

Figure 5A:
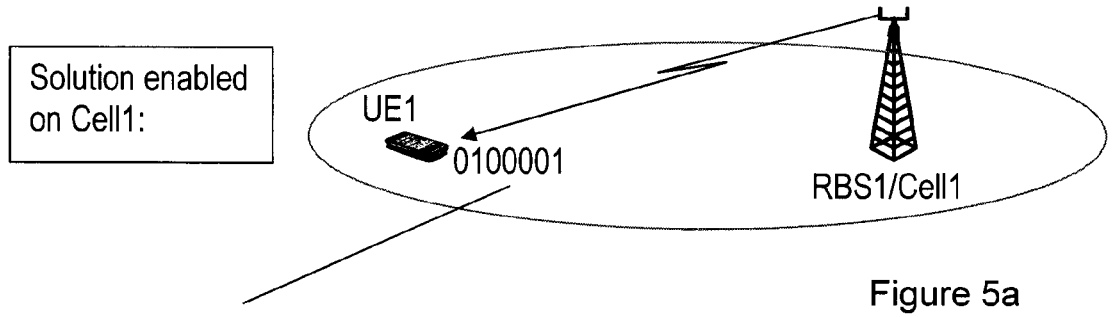
FIGS. 5a-b illustrate how a distance threshold as well as cell synchronizing information are sent to a mobile terminal on a Broadcast Channel.
Figure 5B:
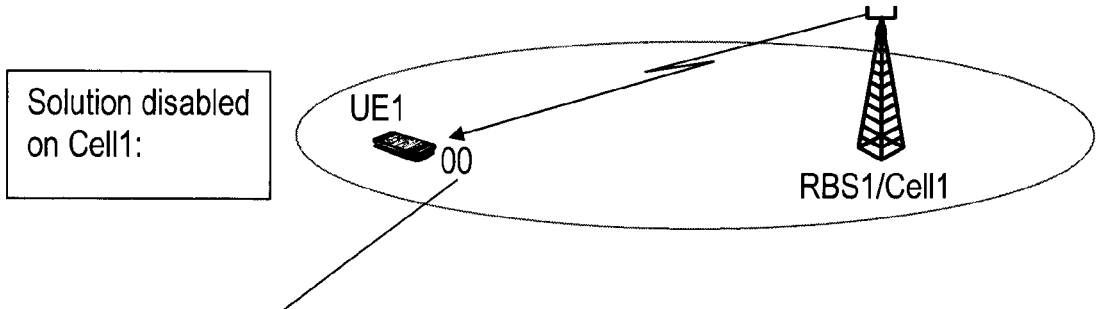

The criterion or threshold described above is a new parameter that may be set by the operator of the communication system in which the RBS and the mobile terminal are operated. The threshold or an indicator of the threshold may be sent over the air interface to the mobile terminal. For example, the Broadcast Channel may be used for communicating such a parameter to the mobile terminal, which is illustrated in FIGS. 5a and 5b. The meaning of the bits, i.e. '00' and '0100001', shown in FIGS. 5a and 5b will be explained in the following paragraph. Depending e.g. on whether the cell is located in an urban or in a rural area, the operator might set different values for the threshold in the network.

Method 2:

The second method is based on the detection of cell timing. This method may be used in systems applying time-synchronized cells.

There is an increasing need for time-synchronized cells, e.g. in order to manage inter-cell interference. One example of such interference management is 3GPP EUTRAN ICIC (Inter-Cell Interference Control), which can be performed on a time- and frequency basis, if cells are synchronized on subframe level. A second example of interference management is time-aligned scheduling in HSPA (High Speed Packet Access). A third example is EUTRAN Cell Range Expansion through use of Almost Blank Subframes (ABS), where the macro cell mutes PDSCH (Physical Downlink Shared Channel) in selected subframes, which are used by the underlaid cells to extend their coverage.

In this second method, the UE (User Equipment) is informed of that neighbor cells are synchronized, e.g. through cell broadcast, as shown in FIGS. 5a and 5b. This information may alternatively be conveyed by other methods, e.g. signaling on lower protocol layers than RRC, such as encoding of PHY layer, or other methods evident to those skilled in the art. In the example illustrated in FIGS. 5a and 5b, the format of the new parameter is here illustrated as either XYabcde (FIG. 5a) or just XY (FIG. 5b). Where if X=0=>cells are synchronized, and if X=1=>cells are not synchronized.

If Y=0=>Method 2 is disabled, and in that case "abcde" are absent. If Y=1=>Method 2 is used & "abcde" represent a threshold, e.g. in km (kilometers). It should be noted that the above example describes the logical content. The coding of the information may differ. For example, a logarithmic scale could be used for distance, and/or the parameters corresponding to XYabcde above could be signaled in different SIBs (System Information Broadcast).

Figure 6A:
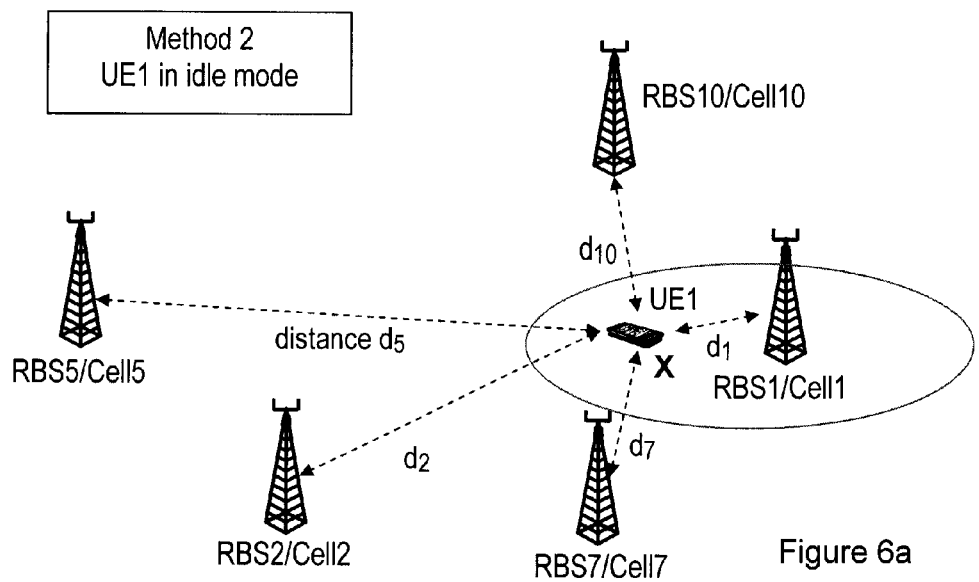
FIG. 6a shows how a mobile terminal in idle mode estimates its distance to the surrounding RBSs.
Figure 6B:
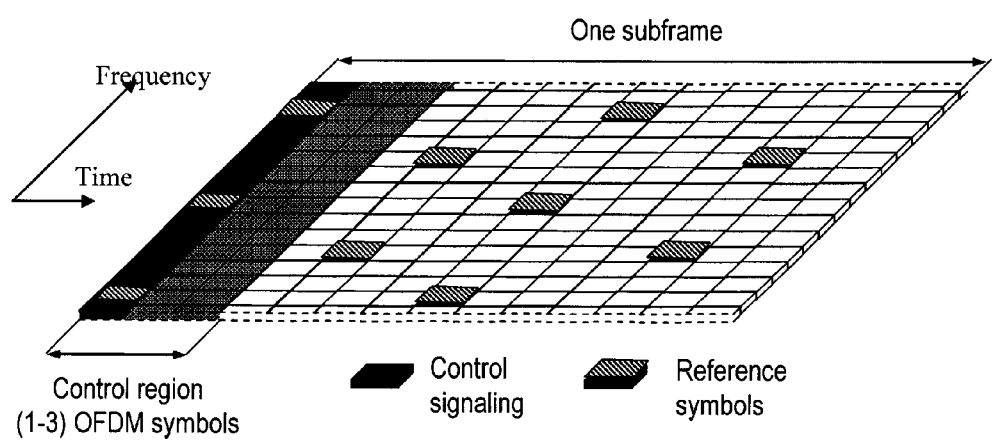
FIGS. 6b-e illustrate different signal constellations, which could be used for Method 2.
Figure 6C:
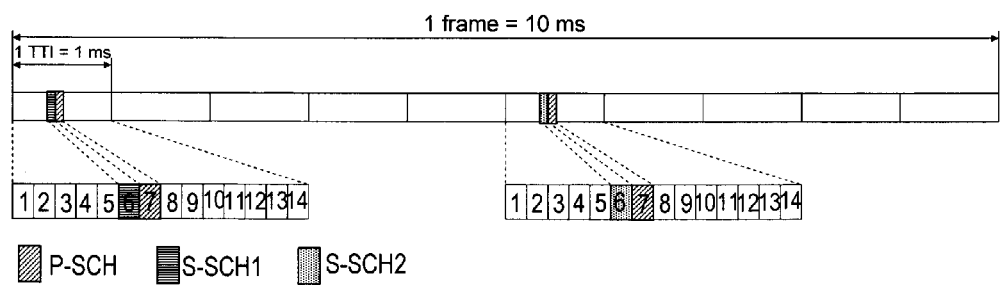
Figure 6D:
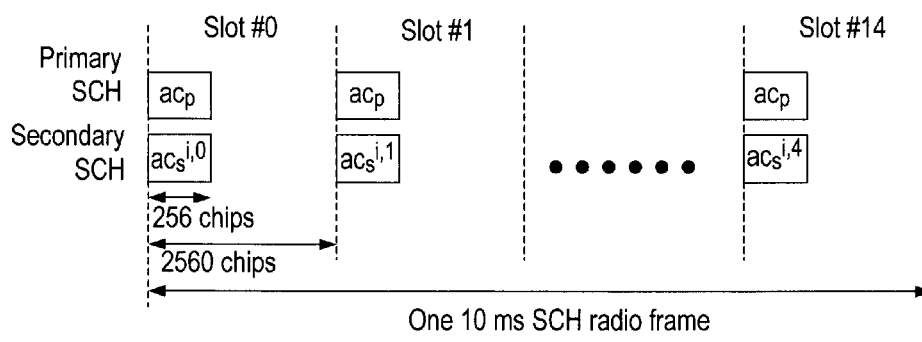

When using Method 2, a UE, e.g. as illustrated in FIG. 6a, can then estimate the distance to cells by detecting the received time of the frame structure (e.g. start of subframe 0). FIGS. 6b-d show examples of signals, which enable the UE to detect the received time.

One example of feasible "time reference" is the Primary and Secondary Synch Signals (PSS/SSS) in E-UTRAN (FIG. 6c). Due to the synchronized state of all cells, PSS/SSS signals arriving later at the UE, come from cells at a larger distance from the UE.

Another example of "time reference" is Cell-specific reference symbols (CRS), shown in FIG. 6b. This example is also taken from EUTRAN. Cell-specific reference symbols (CRS) are located in pre-defined positions of every subframe. These positions are in the first and third last OFDM symbol of each slot. The UE needs to synchronize and monitor PSS/SSS and CRS in order to perform normal cell reselection, i.e. there is no added UE complexity to measure these signals. A third example is P-SCH/S-SCH (Primary and Secondary Synchronization Channel, see FIG. 6d) in UTRAN (Universal Terrestrial Radio Access Network). In general, the UE can use one or more reference signals. The (combination of) reference signal(s) must have a known downlink transmit time position, be related to individual cells and be present in all cells.

Figure 6E:
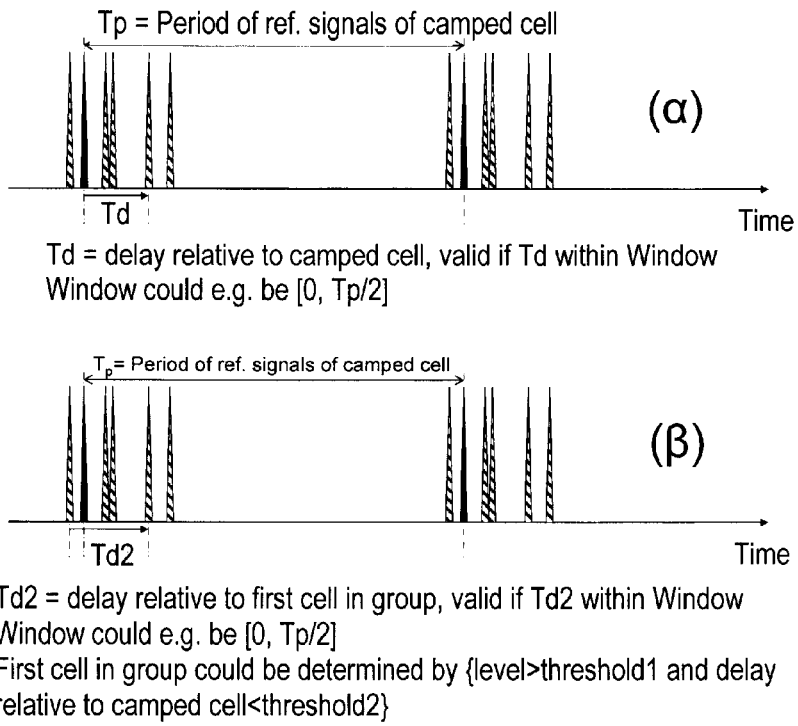

Below it will be elaborated on the potential accuracy of method 2. There is no fixed reference for the UE, which represents 'zero distance'='zero radio path delay', but the UE should nevertheless estimate if some cells have radio path delay larger than a threshold value. Two methods to estimate radio path delay are:

α (alpha). Compare the time position of all cells to the time position of the cell, which the UE currently camps on. Exclude cells, for which the difference>threshold, in order to avoid wrap-around effects (FIG. 6e, case (α)).

β (betha). Compare the time positions of all cells to the time position of the estimated first received cell reference, i.e. from the closest cell (FIG. 6e, case (β)).

If time position is only taken from P-SCH or PSS, then the delay resolution range is maximum 1 ms or 0.67 ms, since signals are transmitted with those intervals. If the UE also uses S-SCH or SSS to derive time position, then the delay resolution range is on a frame level=10 ms. With method β, a UE cannot accurately determine which received reference signal is "first", i.e. received from the closest cell, unless the transport delay is limited approximately to <0.5 times the period. Hence radio path delay can be resolved up to approximately 0.5 or 5 msec range, respectively. The first alternative should be adequate, since 0.5 msec corresponds to 150 km, which is a considerable distance in this context.

Note that ABS benefits strongly from an alignment, which is well within a Cyclic Prefix, i.e. in the order of 1 microsecond. Hence, no new, more stringent requirements are needed in order to enable the method proposed herein.

Method 3:

The third method relates to cell distance detection based on cell coverage information and terminal position.

Data Base Creation

If UEs are configured to report the global cell identity of the best serving cell candidate or candidates, this information could be stored in a database together with position information on the UE. Such position information could be reported by the UEs in association with reporting the global cell identity of candidate cells. In this way, by use of many reports from different UEs, a database could be build up, giving an indication of the coverage of the respective cells e.g. in a large area, such as a region, country or even worldwide.

Use of Data Base by Terminal

The information in such a database could, on regular basis, be fed to UEs and be stored in a memory in the UEs. Thus, UEs would have knowledge of the coverage areas of all cells comprised in the database. The UEs perform cell search on a regular basis, according to principles for the specific Radio Access technology (RAT) used, and thus detect potential cells for camping on as well as to connect to, once a connection setup is needed. The UEs may also perform a position estimate on a regular basis, e.g. by using GPS. Once a connection set up is needed for a UE, the UE first checks the distance between the UE and the strongest cell (may also be denoted "camping cell") and compare the distance with the distance to other detected (via cell search) neighboring cells. If it turns out that the distance to the strongest cell is significantly larger (larger than a threshold, threshold information could be included in the data base, and varying depending on global cell IDs, regions etc etc.) than the distance to, say the second strongest detected cell, the UE has detected an "error event", as described above. Thus, it may be concluded that the strongest cell is a distant cell.

Alternatively or in addition, which may be regarded as a fourth method or a variant of the third method, information on the positions of the RBSs may be provided to UEs, e.g.

in a broadcast or dedicated message. For example, such information could comprise the GPS position (GCI=pos x) of the respective cells.

Barring of the Undesired Distant Cell and Reselecting the Second Best Cell

When having identified that a top candidate serving cell is 'distant', i.e. at a distance exceeding a threshold, a mechanism for finding an alternative serving cell at a distance below the threshold is started. Such an exemplifying procedure is illustrated in FIGS. 7 and 8.

Figure 7:
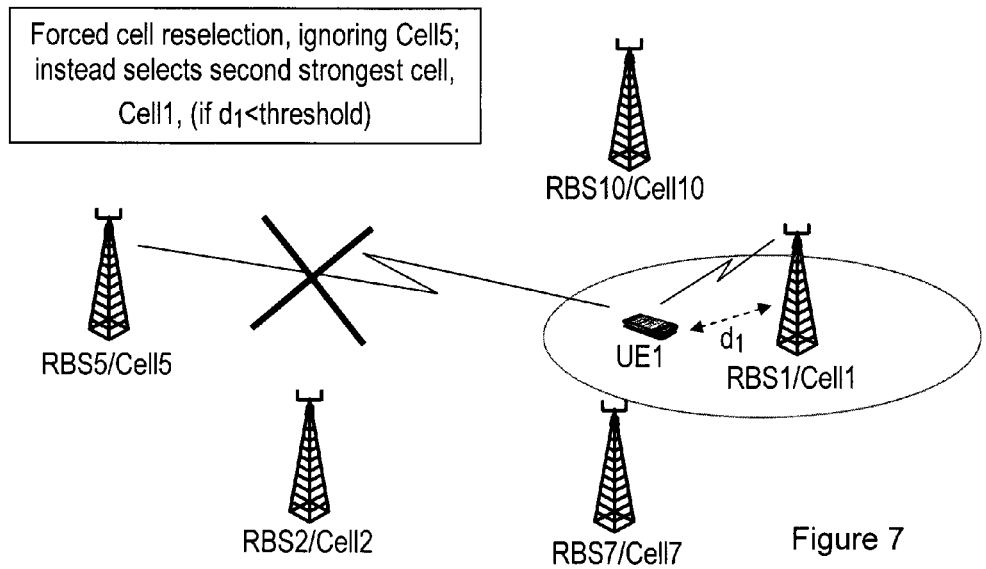
FIG. 7 shows a mobile terminal ignoring the strongest distant cell and reselecting a second best candidate which is closer to the mobile.
Figure 8:
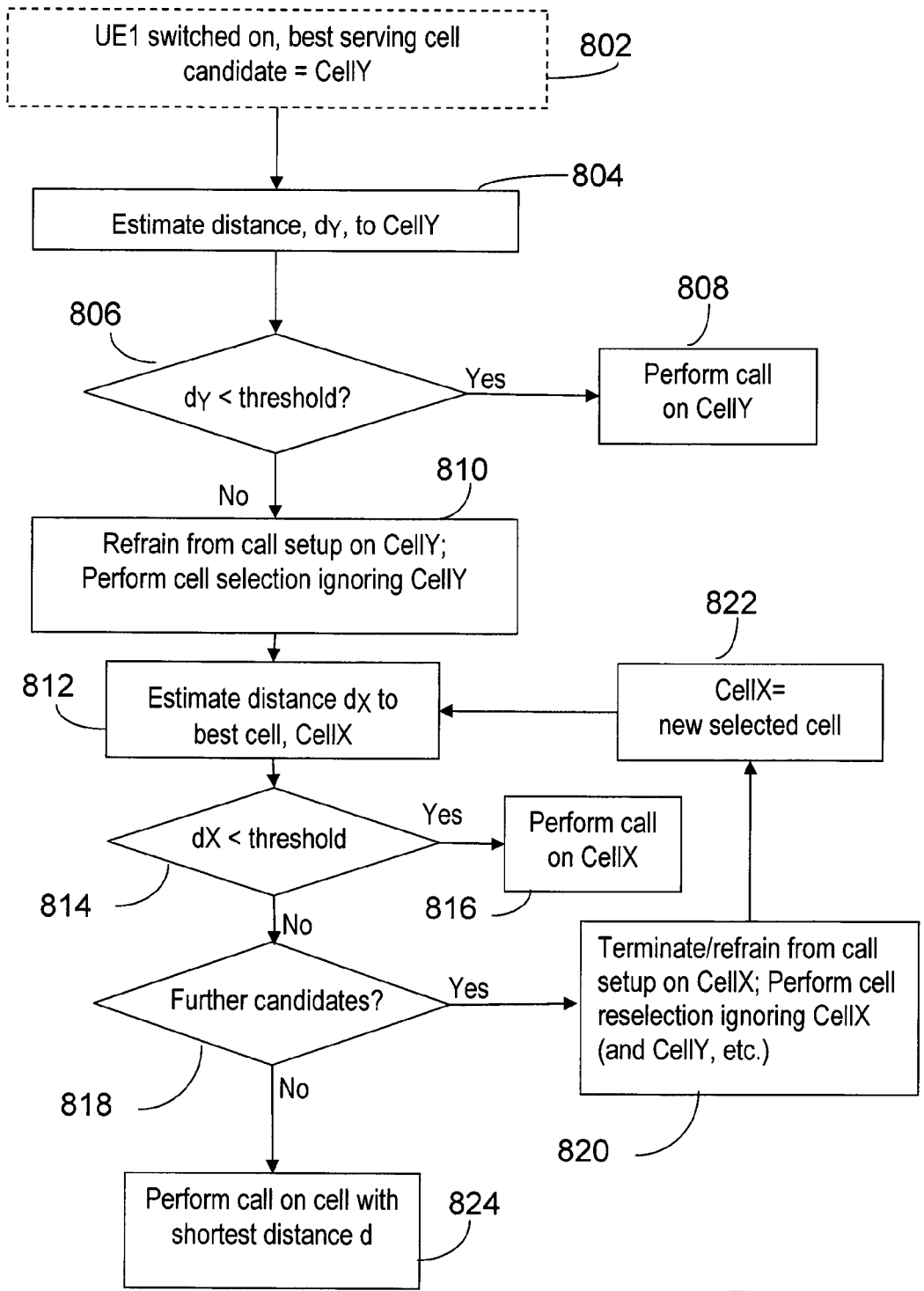
FIG. 8 is a flowchart showing an exemplifying procedure in a mobile terminal.

Using Method 1, 2 or 3:

From system information of the broadcast channel of an RBS associated with a 'distant' cell, and/or from specific RRC messages from said RBS, the UE is informed of all the neighbor cells of the undesired 'distant' cell, which is illustrated as the Cell5, in FIG. 7. However, as Cell5 is at a considerable distance from the UE, i.e. further away than a certain threshold, its neighbor cells may also, for obvious reasons, be located at a considerable distance from the location where the UE is about to perform the call. For that reason, the proposed algorithm does not select an alternative serving cell candidate from the neighbor list of the undesired 'distant' cell. Instead, the distant cell is 'barred' or put under a 'ban', such that said cell should not be selected during a subsequent search for an alternative candidate serving cell.

Thus, after e.g. terminating the initiated RA procedure (in case of method 1) with the distant cell (cf. Cell 5 in FIG. 7), the UE makes a new cell reselection, in which the distant cell is ignored, and thus e.g. the second best cell is selected (illustrated as Cell 1 in FIG. 7). When having selected a new serving cell candidate, the distance to the RBS associated with this newly selected cell should be determined and also be compared with the threshold, in order to verify that the new candidate is suitable as serving cell in terms of distance. The terms "best cell" and "second best cell" used herein refer to the received signal power level from the cells in question. The best cell, i.e. serving cell candidate, is here assumed to be the cell from which the received signal strength, alt. received signal power or quality, is most favorable, i.e. strongest, highest or "best" in some aspect.

If the new candidate cell is another 'distant' cell, denoted e.g. Cellx, then the distance from the UE to the previously evaluated Cell5 may be compared to the distance from the UE to Cellx. For example, if the distance to Cellx is smaller than the distance to Cell5, the call is made on Cellx. Otherwise, Cellx is barred and Cell5 (which is unbarred) is reselected again and the call is made on Cell5, despite the fact that it is a 'distant' cell. The procedure described above is shown in a flowchart in FIG. 8. As an alternative to reselecting a cell known to be a 'distant' cell, the next best cell could be selected as a candidate and be evaluated, e.g. the third or fourth best cell (if the first and second best cells have been determined to be distant cells).

Cell Reselection Based on Geographical Distance

Using Method 2 or 3:

In this case the UE can be made aware of distant 'inappropriate cells' prior to RRC connection establishment (if cell broadcast is used and, if some 'validity area' is provided, e.g. via dedicated signalling at an earlier occasion). Hence, cell reselection can be modified, so that the UE evaluates a combination of (a) downlink signal quality, (which is used today), and (b) estimated distance. If using this type of solution, an appropriate serving cell could be selected in an efficient way.

How to Enable/Disable the Methods

The methods described above could be enabled/disabled in a number of different ways. Two exemplifying ways to enable/disable the proposed methods will be described below. These examples will be referred to as the 'automatic trigger' and the 'manual trigger'.

For the purpose of managing the enabling/disabling of Method 1, Method 2 and/or Method 3, a flag on the GUI (Graphical User Interface) of RBSs could be developed on OSS. By introducing such a flag, the operator is enabled to choose if she/he wants to enable/disable Method 1, Method 2 and/or Method 3 either manually or automatically.

Figure 9:
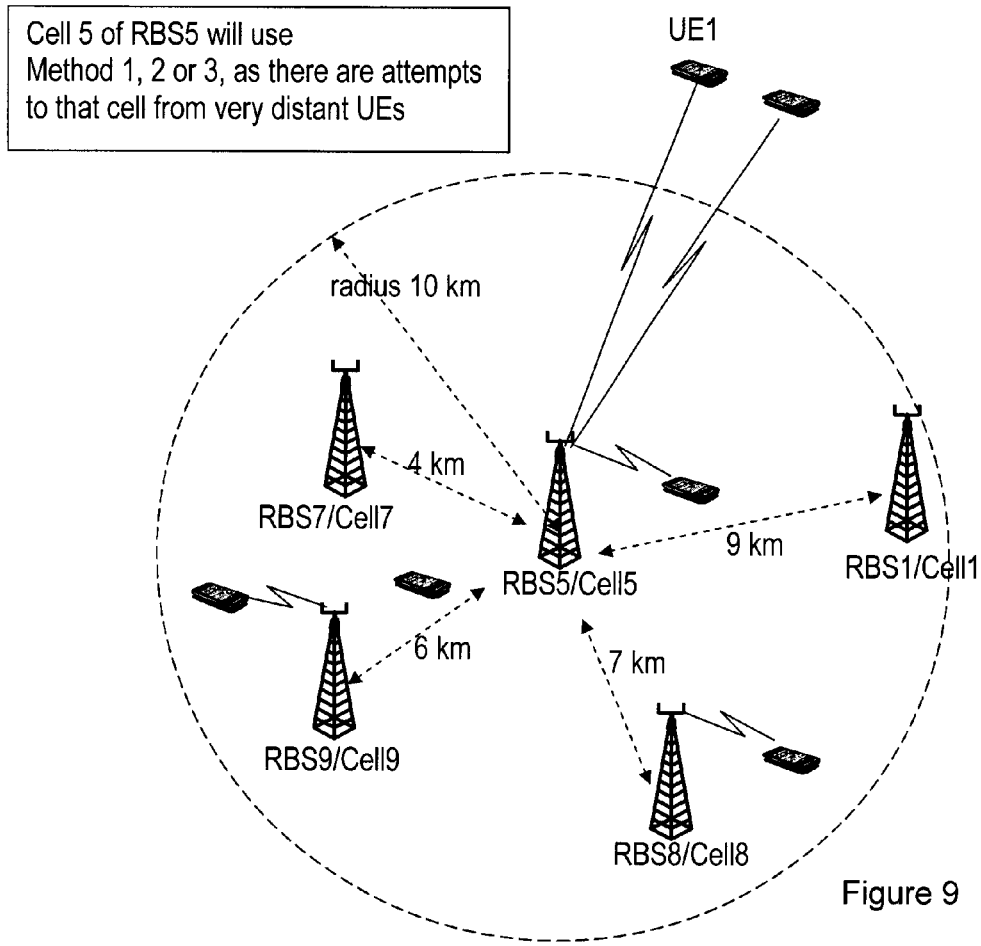
FIG. 9 shows how an operator could select to apply a method according to the technology suggested herein in part of the network, e.g. in RBSs to which call setup attempts are made from distant mobile terminals.

The Automatic Trigger:

A control unit, denoted e.g. 'check distant cell unit', could be developed for the proposed methods in order to be implemented on the OSS. This control unit could check the value of a counter of 'distant cells' every certain period of time, e.g. every 5 or 15 mn (minutes), where the counter may reflect e.g. the number of UEs at different distance ranges from the RBS. If the (value of the) counter fulfills a criteria, e.g. exceeds a predefined threshold, Method 1, Method 2 and/or Method 3, depending on operator setting choice, is automatically triggered (i.e. enabled, activated) by the software of the RBS on all cells of that RBS, cf. RBS5 illustrated in FIG. 9.

Regarding disabling (i.e. deactivation) of the proposed Method 1, Method 2 and/or Method 3 when the automatic trigger is used, the control unit on OSS could determine whether a corresponding counter of 'distant cells' fulfills a criteria, e.g. is below a certain threshold. If 'yes', the Method 1, Method 2 or Method 3, whichever is active, is disabled automatically by OSS. If 'no', the feature remains active.

The Manual Trigger:

In this case the operator can at any time enable Method 1, Method 2 and/or Method 3. For security reasons, whenever one of the methods is enabled, either manually or automatically, an alarm may be reported to the OMC (Operation and Maintenance centre). The alarm is then cleared once the method is disabled.

When using the 'manual trigger', the Operator could disable the methods, Method 1, Method 2 and/or Method 3, manually, at any time via e.g. an OSS GUI (Graphical User Interface) flag.

Reporting of Distant Cells

Figure 10:
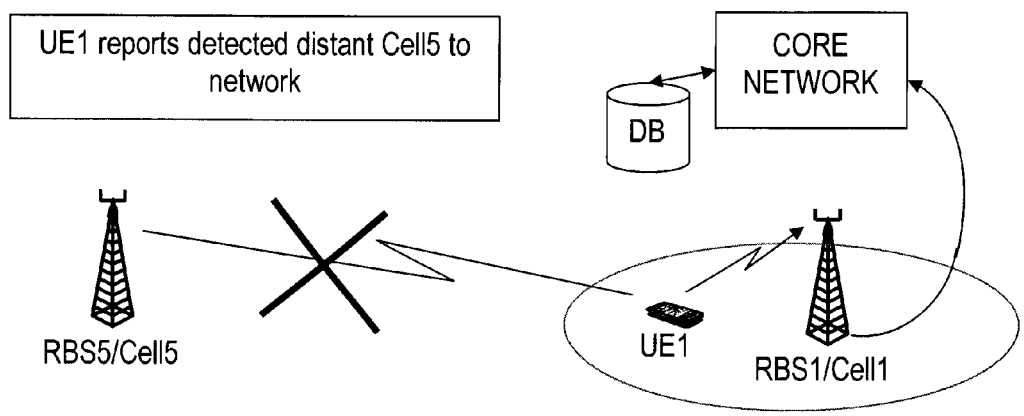
FIG. 10 shows a mobile terminal reporting the identity of a distant cell (e.g. via an RRC Measurement Report) and that the information is saved in a database.

Each time a UE identifies an undesired distant cell, according to a solution described herein, the UE may store the identity of the distant cell in a memory, such as a database. Then, e.g. at the first completed call setup after an encounter/identification of a distant cell, the UE reports the cell identity of the distant cell to the network, i.e. by signaling to the RNC (Radio Network Controller) (via NodeB) in case of UMTS, or to the eNodeB (evolved NodeB) in case of EUTRAN, etc. The cell identity of the undesired distant cell could e.g. be indicated in a Measurement Report message, as illustrated in FIG. 10. The identities of reported distant cells could then be forwarded to and accumulated in a database on the OSS. For example, the mechanism "Minimization of Drive Tests" could be used, and note that the use of "Measurement Report" is only one reporting option.

Example Procedure, FIG. 8

An exemplifying procedure in a mobile terminal according to the technology suggested herein will be described below with reference to FIG. 8. The mobile terminal is assumed to be associated with a set of serving cell candidates comprising at least a first and a second serving cell candidate.

For information a first step 802 is illustrated in FIG. 8, representing that the mobile terminal is switched on, and that the best serving cell candidate from the set is CellY. The distance dY to CellY is estimated in an action 804, preferably using any of methods 1-3 described herein. It is determined in an action 806 whether the distance dY exceeds a predetermined distance or not, based on a criterion. The criterion may involve e.g. a threshold value given in meters. If the distance dY is found to be lower than the predetermined distance, the mobile terminal may go ahead and perform a call on CellY. In case of using Method 1, the mobile terminal already camps on CellY and has initiated a RA to CellY.

If the distance dY is found to exceed the predetermined distance, the mobile terminal should refrain from connecting to CellY. Action 810 in FIG. 8 illustrates that the mobile terminal refrains from a call setup to CellY. That is, in case an attempt to connect to CellY has been initiated, e.g. by sending an RA request, this attempt is interrupted, and CellY is, in all cases, disregarded as serving cell candidate. Further, a cell reselection may be performed in action 810, in which CellY is disregarded/ignored. When disregarding CellY, another cell will be the best cell, here denoted CellX.

The distance dX to CellX is estimated in an action 812, and it is determined in an action 814 whether the distance dX exceeds a predetermined distance or not, based on a criterion. By the performing of the above described procedure, selection of a serving cell within a predefined distance from the mobile terminal is enabled. The procedure may continue e.g. until a candidate serving cell within the predefined distance is found in the set of candidates. Such a continued process is illustrated by the actions 818-822 in FIG. 8. If no candidate serving cell in the set, or e.g. none of a subset of the candidate serving cells, is located within the predetermined distance, the candidate serving cell of the considered set or subset located at the shortest distance to the mobile terminal may be selected to be a serving cell. This alternative is illustrated as action 824 in FIG. 8.

Further, as previously described, if using Method 2 or Method 3 for determining the distance to candidate cells, all or a subset of the candidate serving cells could be evaluated in parallel. The set of serving cell candidates could comprise all or a subset of (e.g. a predefined number of the best) cells from which reference signals are received by the mobile terminal.

The distance to a candidate serving cell could be estimated based on the time difference between a transmission of a request for Random Access, RA, and the receiving of a response to the request. Alternatively, the distance could be estimated based on information related to the geographical position of the mobile terminal and of the candidate serving cell. Such information could be provided to the mobile terminal from an RBS e.g. via a broadcast channel. Alternatively, when cell synchronization is applied, the distance may be estimated based on a difference in arrival time of a signal from the evaluated serving cell candidate and a signal from another cell, e.g. another cell at a known distance.

One or more of methods 1-3 may be used by a mobile terminal. The method used may be selected e.g. based on what is most suitable in a current situation, such as e.g. if the mobile terminal has a access to information about the geographical position of the candidates or not.

Figure 11:
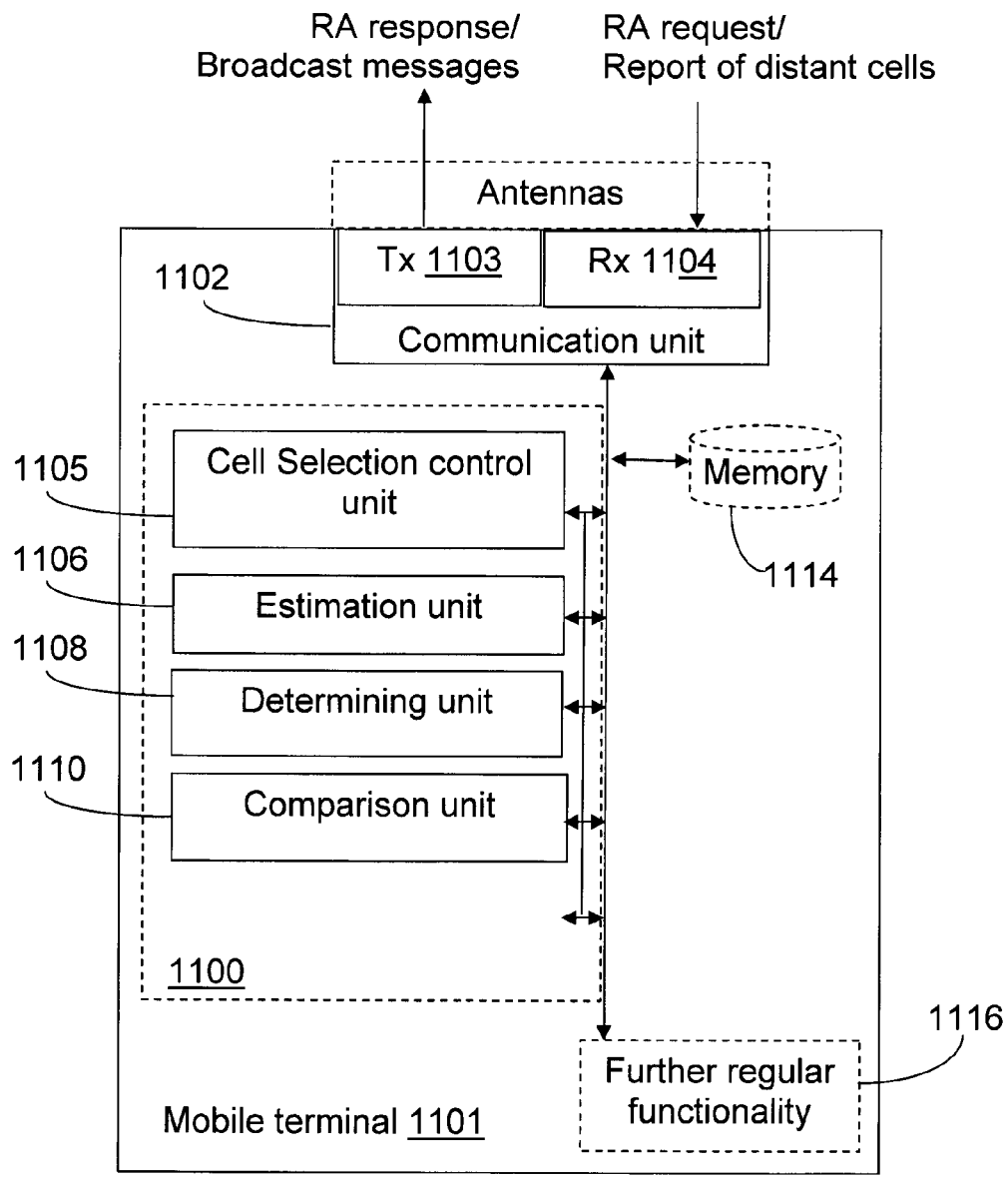
FIG. 11 is a block chart illustrating a mobile terminal according to an exemplifying embodiment.

Exemplifying Arrangement, FIG. 11

Below, an exemplifying arrangement in a mobile terminal, adapted to enable the performance of the above described procedure will be described with reference to FIG. 11. The mobile terminal is operable in a wireless communication system, and operable to be associated with a set of serving cell candidates, derived e.g. by cell search.

The mobile terminal and the arrangement are illustrated as to communicate with other entities via a communication unit 1102, which may be considered to comprise means for wireless uplink and downlink communication. The arrangement may be regarded as representing the parts of the mobile terminal which are adapted to enable the performance of the above described procedure. The arrangement 1100 is surrounded by a dashed line in FIG. 11. The arrangement and/or mobile terminal may further comprise other functional units 1116, for providing e.g. remaining regular terminal functions. The arrangement and/or mobile terminal may further comprise one or more storage units 1114.

The arrangement 1100 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIG. 8.

The arrangement 1100 may be implemented and/or described as follows: The arrangement 1100 comprises an estimation unit 1106, adapted to estimate the distance from the mobile terminal to (an RBS associated with) a serving cell candidate. This can be done in a number of different ways, as previously described. The arrangement further comprises a determining unit 1108, adapted to determine whether the estimated distance exceeds a predetermined distance, based on a criterion. The arrangement further comprises a cell selection control unit 1108, adapted to initiate a cell reselection if the estimated distance exceeds the predetermined distance, excluding the evaluated serving cell candidate from selection, to find another serving cell candidate for evaluation. Thus, selection of a serving cell, from amongst the serving cell candidates in the set, within a predefined distance from the mobile terminal is enabled (when such a serving cell candidate exists in the set of candidates).

The arrangement may further comprise a comparison unit 1110, adapted to compare the estimated distances to a plurality of serving cell candidates with each other, and to indicate the serving cell candidate associated with the shortest distance, thus enabling selection of the serving cell candidate being associated with the shortest estimated distance as serving cell.

Figure 12A:
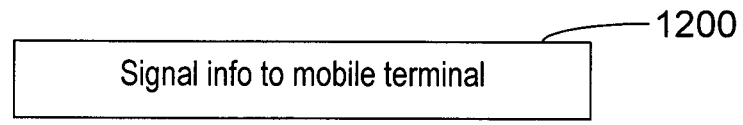
FIG. 12a is a flowchart showing an exemplifying procedure in a network node.

Exemplifying Procedure, FIG. 12*a*

Below a method in a network node in a communication system will be described with reference to FIG. 12*a*. The communication system is assumed to comprise a mobile terminal associated with a set of serving cell candidates. The mobile terminal is assumed to comprise an arrangement as the one previously described in conjunction with FIG. 11. The network node could be an RBS, such as an eNB (EUTRAN) or a NodeB (UMTS).

The method comprises signaling information to the mobile terminal, where the information comprises an indication of whether cell synchronization is applied (cf. Method 2 described above), an indication of a predetermined distance, representing an upper limit for a distance to a serving cell, and/or information related to the geographical location of a number of the candidate serving cells (cf. Method 3 described above). This method step is illustrated as action 1200 in FIG. 12*a*. This type of information has previously not been provided to mobile terminals. The information may be provided via a broadcast channel, in which case the mobile terminal may be unknown to the network node, or a dedicated channel. The use of the method enables the mobile terminal to select a serving cell, from amongst the serving cell candidates in the set, within the predefined distance from the mobile terminal.

Figure 12B:
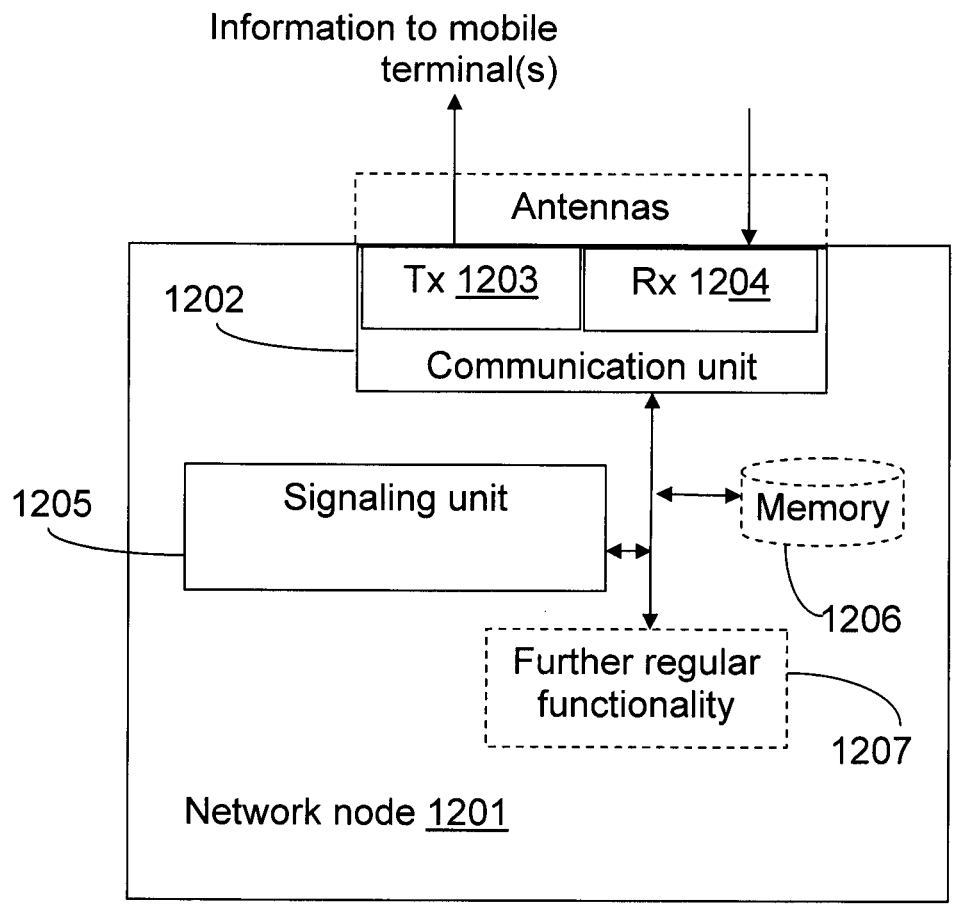
FIG. 12b is a block chart illustrating a network node according to an exemplifying embodiment.

Exemplifying Network Node, FIG. 12b

Below, an exemplifying arrangement in a network node, adapted to enable the performance of the above described procedure will be described with reference to FIG. 12b. The network node is assumed to be operable in a communication system which is assumed to comprise a mobile terminal associated with a set of serving cell candidates. The mobile terminal is assumed to comprise an arrangement as the one previously described in conjunction with FIG. 11. The network node could be an RBS, such as an eNB (EUTRAN) or a NodeB (UMTS).

The network node 1201 is illustrated as to communicate with other entities via a communication unit 1202, which may be considered to comprise means for wireless uplink and downlink communication, such as a transmitter 1203 and a receiver 1204. The network node 1201 may further comprise other functional units 1207, for providing e.g. regular node functions. The network node 1201 may further comprise one or more storage units 1206.

The network node 1201 could be implemented by processing circuitry, e.g. by one or more of: a processor or a micro processor and adequate software (and storage therefore), a Programmable Logic Device (PLD) or other electronic component(s)/processing circuit(s) configured to perform the action mentioned above in conjunction with FIG. 12a.

The network node 1201 may be implemented and/or described as follows: The network node 1201 comprises a signaling unit 1106, adapted to signal information to the mobile terminal, where the information comprises an indication of whether cell synchronization is applied, an indication of a predetermined distance, representing an upper limit for a distance to a serving cell; and/or information related to the geographical location of a number of the candidate serving cells.

Figure 13:
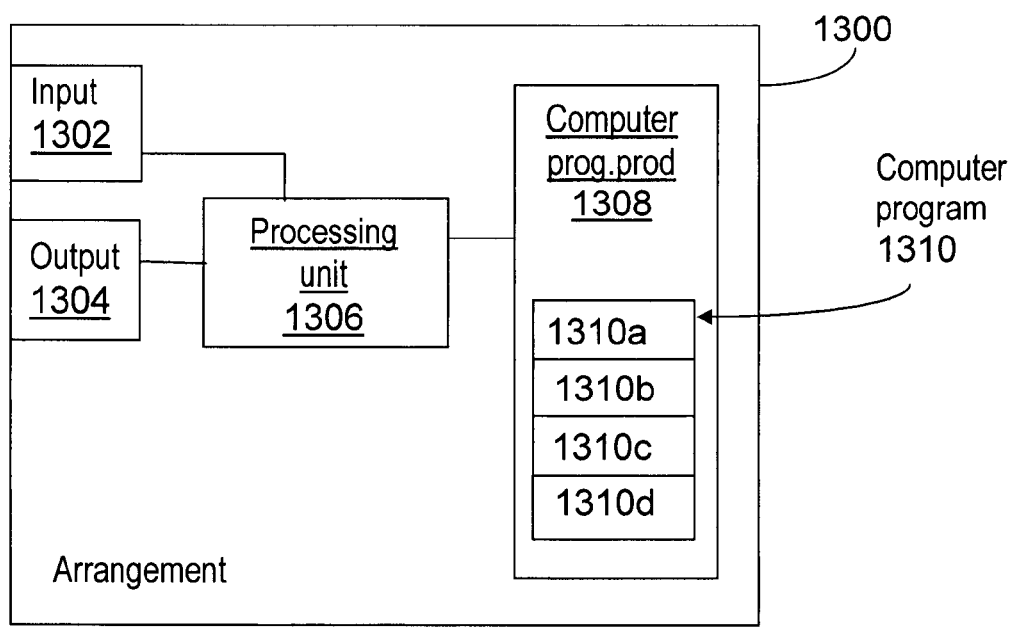
FIG. 13 is a block chart illustrating an arrangement according to an exemplifying embodiment.

Exemplifying Arrangement FIG. 13

FIG. 13 schematically shows a possible embodiment of an arrangement 1300, which also can be an alternative way of disclosing an embodiment of the arrangement illustrated in FIG. 11. Comprised in the arrangement 1300 are here a processing unit 1306, e.g. with a DSP (Digital Signal Processor). The processing unit 1306 may be a single unit or a plurality of units to perform different actions of procedures described herein. The arrangement 1300 may also comprise an input unit 1302 for receiving signals from other entities, and an output unit 1304 for providing signal(s) to other entities. The input unit 1302 and the output unit 1304 may be arranged as an integrated entity.

Furthermore, the arrangement 1300 comprises at least one computer program product 1308 in the form of a non-volatile memory, e.g. an EEPROM (Electrically Erasable Programmable Read-Only Memory), a flash memory and a hard drive. The computer program product 1308 comprises a computer program 1310, which comprises code means, which when executed in the processing unit 1306 in the arrangement 1300 causes the arrangement and/or a node in which the arrangement is comprised to perform the actions e.g. of the procedure described earlier in conjunction with FIG. 8.

The computer program 1310 may be configured as a computer program code structured in computer program modules. Hence, in an exemplifying embodiment, the code means in the computer program 1310 of the arrangement 1300 comprises an estimation module 1310a for estimating the distance from the mobile terminal to a selected serving cell candidate. The arrangement 1300 further comprises a determining module 1310b for determining whether the estimated distance exceeds a predetermined distance. The computer program further comprises a cell selection control module 1310c for finding another serving cell candidate for evaluation. The computer program 1310 may further comprise a comparison module 1310d for comparing the estimated distances to a plurality of serving cell candidates with each other The modules 1310a-d could essentially perform the actions of the flow illustrated in FIG. 8, to emulate the arrangement illustrated in FIG. 11. A similar arrangement could be implemented to perform the action of the flow illustrated in FIG. 12a, to emulate at least part of the node illustrated in FIG. 12b Although the code means in the embodiment disclosed above in conjunction with FIG. 13 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities. Although the description above contains many specific examples, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method, for supporting cell selection, in a mobile terminal associated with a set of serving cell candidates, the method comprising:
   evaluating a first serving cell candidate from the set by estimating the distance from the mobile terminal to the first serving cell candidate and determining whether the estimated distance exceeds a predetermined distance, based on a criterion;
   in response to determining that the estimated distance exceeds the predetermined distance, refraining from performing a call on the first serving cell candidate, even if the mobile terminal is receiving the strongest radio signals from the first serving cell candidate, and evaluating a second serving cell candidate from the set, thus enabling selection of a serving cell, from amongst the serving cell candidates in the set, within a predefined distance from the mobile terminal; and
   in response to determining that the estimated distance exceeds the predetermined distance, reporting identity of the first serving cell candidate to an Operating Sub System (OSS).

2. The method of claim 1, wherein the set of serving cell candidates comprises cells from which reference signals are received by the mobile terminal.

3. The method of claim 1, wherein the distance is estimated based on the time difference between a transmission of a request for Random Access (RA) and the receiving of a response to the request.

4. The method of claim 1, wherein the distance is estimated based on a difference in arrival time of a signal from the evaluated serving cell candidate and a signal from another cell.

5. The method of claim 1, wherein the distance is estimated based on information related to the geographical position of the mobile terminal and of the serving cell candidate.

6. The method of claim 5, wherein at least the information related to the geographical position of the serving cell candidate is obtained by the mobile terminal from a broadcast transmission.

7. The method of claim 1, further comprising, in response to determining that the distance to the second serving cell candidate also exceeds the predetermined distance:
   comparing the estimated distances to the first and second serving cell candidates with each other; and
   selecting, as serving cell, the serving cell candidate being associated with the shortest estimated distance.

8. The method of claim 1, further comprising receiving an indicator indicating at least one of:
   whether cell synchronization is applied;
   the predetermined distance; and
   the geographical location of a number of the candidate serving cells.

9. A method in a network node in a communication system for supporting cell selection, the communication system comprising a mobile terminal associated with a set of serving cell candidates, the method comprising:
   signaling information to the mobile terminal, the signaled information comprising at least one of:
      an indication of whether cell synchronization is applied,
      an indication of a predetermined distance, representing an upper limit for a distance to a serving cell, and
      information related to the geographical location of a number of the candidate serving cells,
   wherein the mobile terminal is enabled to select a serving cell, from amongst the serving cell candidates in the set, within the predetermined distance from the mobile terminal,
   wherein the mobile terminal is enabled to refrain from performing a call on a serving cell, from amongst the serving cell candidates in the set, even if the mobile terminal is receiving strongest radio signals from said serving cell candidate.

10. The method of claim 9, wherein the signaling is performed via a broadcast channel.

11. An arrangement in mobile terminal for supporting cell selection, the mobile terminal being operable to be associated with a set of serving cell candidates, the arrangement comprising processing circuit configured to:
    estimate the distance from the mobile terminal to a serving cell candidate;
    determine whether the estimated distance exceeds a predetermined distance, based on a criterion;
    in response to determining that the estimated distance exceeds the predetermined distance, initiate a cell reselection, exclude the evaluated serving cell candidate from selection, to find another serving cell candidate for evaluation, even if the mobile terminal is receiving the strongest radio signals from the first serving cell candidate, thus enabling selection of a serving cell, from amongst the serving cell candidates in the set, within a predefined distance from the mobile terminal; and
    reporting identity of the first serving cell candidate to an Operating Sub System (OSS).

12. The arrangement of claim 11, wherein the processing circuitry is configured to estimate the distance based on the time difference between a transmission of a request for Random Access (RA) and the receiving of a response to the request.

13. The arrangement of claim 11, wherein the processing circuitry is configured to, when cell synchronization is applied, estimate the distance based on a difference in arrival time of a signal from the serving cell candidate to be evaluated and a signal from another cell at a known distance.

14. The arrangement of claim 11, wherein the processing circuitry is configured to estimate the distance based on information related to the geographical position of the mobile terminal and of the serving cell candidate.

15. The arrangement of claim 14, wherein the processing circuitry is configured to obtain the information related to the geographical position of the serving cell candidates from a broadcast transmission.

16. The arrangement of claim 11, wherein the processing circuitry is further configured to compare the estimated distances to a plurality of serving cell candidates with each other and to indicate the serving cell candidate associated with the shortest distance, thus enabling selection of the serving cell candidate being associated with the shortest estimated distance as serving cell.

17. A network node operable in a communication system, for supporting cell selection, the communication system comprising a mobile terminal associated with a set of serving cell candidates, the network node comprising:
    a signaling circuit adapted to signal information to the mobile terminal, the information comprising at least one of:
       an indication of whether cell synchronization is applied;
       an indication of a predetermined distance, representing an upper limit for a distance to a serving cell; and information related to the geographical location of a number of the candidate serving cells, wherein the mobile terminal selects a serving cell, from amongst the serving cell candidates in the set, within the predetermined distance from the mobile terminal, and wherein the mobile terminal refrains from performing a call on a serving cell, from amongst the serving cell candidates in the set, even if the mobile terminal is receiving strongest radio signals from said serving cell candidate.

18. The network node of claim 17, wherein the signaling unit is adapted to signal the information via a broadcast channel.

* * * * *